March 13, 1956 G. W. HAVENS 2,738,227
FLUID SPRAYING DEVICE
Filed Nov. 9, 1953
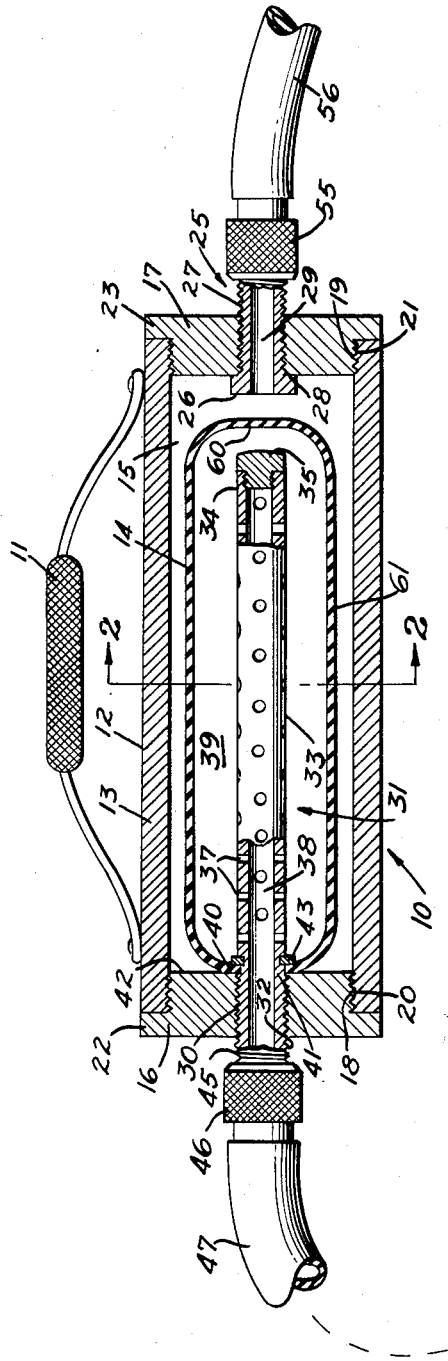
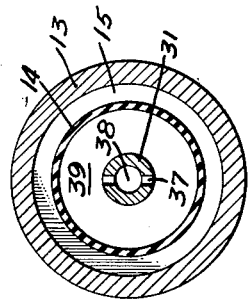
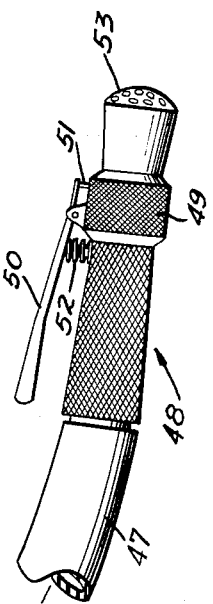
Gerald W. Havens,
INVENTOR.
BY William W. Haefliger
Agent

United States Patent Office 2,738,227
Patented Mar. 13, 1956

2,738,227
FLUID SPRAYING DEVICE
Gerald Walter Havens, San Diego, Calif.

Application November 9, 1953, Serial No. 390,775

4 Claims. (Cl. 299—92)

This invention relates to fluid sprayer units and more particularly to a type of sprayer unit in which fluid to be sprayed is stored within a flexible enclosure and is forced therefrom when desired by fluid pressure outside the enclosure tending to collapse the enclosure.

It is an object of the invention to provide a novel portable fluid delivery apparatus in which there is provided novel means for pressurizing a first fluid in a portable container from a remote second fluid pressure source, and for controllably allowing flow of the first fluid from the container when desired.

It is another object of the invention to provide a novel storage unit for fluid to be sprayed in which the spraying fluid and pressurizing fluid are separated by a flexible deformable enclosure, there being a novel ducted means disposed within the enclosure to limit the collapse of the flexible enclosure when the pressurizing fluid outside the enclosure forces the spraying fluid out of the enclosure through the ducted means, the latter also preventing foreign particles within the enclosure from entering the delivery line.

It is another object of the invention to provide a novel portable fluid spraying apparatus which includes novel means for storing and controllably permitting egress of spraying fluid from the storage apparatus, there being novel means provided for pressurizing the spraying fluid by means of a second fluid without mixing of the two fluids, the source of pressure for the second fluid being located at a remote point.

It is a further object of the invention to provide a novel portable container for spraying fluid which includes a variable volume storage chamber for spraying fluid directly connected to a delivery hose and nozzle, there being means provided for detaching the hose and filling the storage chamber with spraying fluid, and other means detachably connected to the container for pressurizing the external portion of the storage chamber by means of a second fluid delivered to the container from a remote source of fluid pressure.

These and other objects and advantages of the present invention will be apparent from the following description, reference being had to the accompanying drawings wherein a preferred form of the present invention is clearly illustrated.

In the drawings,

Figure 1 is a sectional view of the preferred embodiment of the invention, showing the construction thereof; and Figure 2 is a cross-sectional view of the apparatus taken on line 2—2 of Fig. 1.

Referring now to the drawings, the numeral 10 designates the portable storage apparatus which includes a handle 11 the opposite ends of which are fastened to the external wall 12 of an elongated container 13. The latter may be conveniently made cylindrical in shape in order to conform in cross section to the shape of a thin walled deformable enclosure 14 which is positioned within the chamber 15 provided within the container 13. The container itself may be made of any light material such as aluminum or plastic, or fiber glass, in order to facilitate portability.

The opposite ends of the cylindrical container 13 are preferably left open, and separate means are provided for closing the ends in a fluid tight relation, one such means including separate end walls or covers 16 and 17 which have threaded outer diameters 18 and 19 for engagement with the internally threaded cylindrical wall portions 20 and 21 of the container 13. The end covers also include flange portions 22 and 23 which are coextensive in diameter with the outer wall 12 of the container, and which limit the threaded engagement of the covers 16 and 17 with the threaded end portions of the container.

End cover 17 shown at the right end of the container has an internally threaded aperture formed therein which is adapted to receive in engagement therewith an externally threaded tubular fitting 25 which includes a first portion 26 projecting into chamber 15, and a second portion 27 which is also threaded and which projects outwardly from the end cover 17. Portion 26 of the fitting has an annular shoulder 28 formed thereon which engages the inside wall of the end cover 17 to axially position the fitting with respect to the end cover 17. The tubular fitting is of course provided with a duct 29 communicating with the chamber 15. It will also be understood that the fitting 25 may be fixed in fluid tight engagement with end cover 17, as by means of well known sealing compounds, to prevent leakage of fluid therebetween.

The opposite end cover 16 is similarly apertured and threads are formed internally thereon to engage in fluid tight relation an externally threaded portion 30 of an elongated duct or pipe 31 which has a short threaded portion 32 projecting outwardly from the outer wall of end cover 16, and an elongated portion 33 projecting inwardly into the chamber 15. The internally projecting end portion 34 of the pipe is sealed off from chamber 15 as by means of a threaded plug 35 which is provided with a smoothly contoured outer surface in order to preclude rupture or tearing of the enclosure 14 thereon when the enclosure is collapsed. The internally projecting end portion 34 of the pipe has formed in the walls thereof a large number of holes 37 or ports communicating between the duct 38 within the pipe and the chamber 39 enclosed by the enclosure or bag 14. These holes are preferably made small enough to prevent larger particles and foreign material within chamber 39 from entering the duct 38 within the pipe when the enclosure 14 is collapsed.

The enclosure 14 may comprise a thin walled flexible bag which is elongated in the direction of the container 13, and may be made of a flexible material such as rubber, or a deformable plastic material. The left end portion of the bag has an aperture formed therein with an annular lip or neck 40 surrounding the aperture and encircling the portion 41 of the pipe adjacent the inner wall 42 of the end cover 16. The lip 40 of the enclosure is compressed between the inner wall 42 of the cover 16 and an abutment on the pipe such as the snap ring 43 carried by the pipe in order to form an effective fluid seal between the inner wall 42 and the bag 14, and between the pipe 31 and the bag.

The pipe 39 has a short threaded portion 45 projecting outwardly from end cover 16 to which there may be coupled a threaded attachment 46 connected to a short length of hose 47. A nozzle 48 is joined to the end of the hose, and includes a valve portion 49, a pivoted handle 50 operating a valve opening and closing plunger 51, a spring 52 arranged to bias the handle in valve closing position, and a spray head 53 having a large number of holes formed therein. A similar hose coupling 55 and hose 56 may be attached to the projecting end portion 27 of the fitting 25. The hose 56 is adapted to be connected to a remote source of fluid pressure such as a water pressure of air pressure outlet located at a remote point, the hose 56 serving to transmit the fluid pressure to the portable apparatus or container 13.

The apparatus above described may be very effectively used in spraying operations in the following manner: The hose coupling 46 and hose 47 are disconnected from the projecting end portion 45 of the pipe 31, and the container 13 is held in a vertical position so as to permit a fluid such as insect spray or paint to be poured into the duct 38 of the pipe 31. The fluid will then pass through the ducts 37 into the chamber 39 enclosed by the flexible or deformable bag 14, and will fill the bag to its maximum capacity. The hose coupling 46 is then attached to the projecting portion 45 of the pipe to connect the spray nozzle 48 with the chamber 39 wherein the fluid is stored. The hose coupling 55 and hose 56 are then connected to the threaded fitting 25 and the opposite end of the hose 56 is connected to a remote source of fluid pressure, causing water or air under pressure to flow into chamber 15, filling that chamber and collapsing the flexible enclosure 14 until the fluid pressure within chamber 39 equals that in chamber 15. Fluid spray under the pressure of the fluid in chamber 15 will then occupy chamber 39, and the hose 47 up to the valve positioned within the nozzle 48. When the valve is opened by handle 50, the pressure in chamber 15 will drive the fluid spray in chamber 39 outwardly through the hose 47 and through the nozzle 53, and the flexible enclosure 14 will slowly be collapsed as the fluid within chamber 39 is exhausted. The elongated duct or pipe 31 forms a support limiting the collapse of the enclosure 14 and bringing about or causing an orderly collapse of the enclosure since the end portion 60 of the bag cannot move leftwardly beyond the end portion of the pipe 34. Thus the cylindrical wall 61 of the enclosure is caused to collapse generally radially inwardly toward the pipe 31 as the pressure of the fluid in chamber 15 forces the spraying fluid within chamber 39 into the duct 38 within the pipe 31 and thence outwardly through hose 47. The pipe 31 therefore not only serves as a means for keeping clogging material in chamber 39 out of the hose 47 and spray nozzle 48, but also causes an orderly collapse of the membrane or bag separating chambers 39 and 15, and thereby materially aids the effecting of smooth flow with minimum pressure drop of spray fluid from chamber 39 into the hose 47 and thence of course to the nozzle.

It is also emphasized that the invention also encompasses the provision of a novel portable spraying apparatus which utilizes the pressure of a second fluid such as water to pressurize the spraying fluid, and it is pointed out that the apparatus makes possible the storage of a maximum amount of spraying fluid per overall size of the container 13, since the pressurizing means is external thereto. The container 13 may be carried by means of handle 11 in one hand, and the nozzle 48 may be carried in the other hand to form a compact and extremely useful portable spraying apparatus, for all spraying purposes.

While the form of embodiment of the invention as herein disclosed constitutes a preferred form, it will be understood that other forms might be adopted all coming within the scope of the claims which follow.

I claim:

1. In a fluid delivery system: a source of fluid pressure; an elongated container having a fluid entrance aperture and a fluid exit aperture formed in the walls thereof, means connecting said source of fluid pressure in fluid delivering communication with said fluid entrance aperture; an elongated perforated tube mounted within said container to an end wall thereof and in fluid delivering communication with said fluid exit aperture; and a deformable fluid tight enclosure disposed within said container and enclosing said tube, said enclosure having an aperture formed therein, said aperture being bounded by a lip of said enclosure disposed between a portion of said tube and a portion of said container adjacent the fluid exit aperture and in pressure sealing engagement therewith.

2. The invention as defined in claim 1 comprising an elongated cylindrical container having removable opposite end walls.

3. The invention as defined in claim 1 in which said means includes a threaded tubular fitting connected into said entrance aperture for coupling with a threaded hose connection.

4. The invention as defined in claim 1 including a spray nozzle and a manually controllable valve connected therein, and a flexible conduit connected between said exit aperture and said nozzle for conducting spray fluid from within said enclosure to said nozzle.

References Cited in the file of this patent

UNITED STATES PATENTS

| | | |
|---|---|---|
| 821,875 | Kneuper | May 29, 1906 |
| 1,473,979 | Simmons | Nov. 13, 1923 |
| 1,628,834 | Frank | May 17, 1927 |
| 1,731,767 | Cramer | Oct. 15, 1929 |